United States Patent
Lim et al.

(10) Patent No.: US 8,904,084 B2
(45) Date of Patent: Dec. 2, 2014

(54) SOLID STATE DRIVE DEVICE

(75) Inventors: Seungho Lim, Suwon-si (KR); Sil Wan Chang, Gunpo-si (KR); Woonhyug Jee, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 523 days.

(21) Appl. No.: 12/662,992

(22) Filed: May 14, 2010

(65) Prior Publication Data

US 2010/0293319 A1  Nov. 18, 2010

(30) Foreign Application Priority Data

May 18, 2009 (KR) ........................ 10-2009-0043143

(51) Int. Cl.
G06F 12/00 (2006.01)
G06F 12/02 (2006.01)
G06F 3/06 (2006.01)

(52) U.S. Cl.
CPC .......... G06F 12/0246 (2013.01); G06F 3/0658 (2013.01); G06F 3/0613 (2013.01); G06F 3/0659 (2013.01); G06F 3/0679 (2013.01); G06F 2212/7208 (2013.01)
USPC .................... 711/103; 711/E12.002; 710/316

(58) Field of Classification Search
CPC ... G06F 3/0658; G06F 3/0659; G06F 3/0679; G06F 3/0613; G06F 12/0246; G06F 3/0629
USPC ............ 711/103, 111, 154, E12.002; 710/38, 710/316
See application file for complete search history.

(56) References Cited

U.S. PATENT DOCUMENTS

| | | | |
|---|---|---|---|
| 6,385,681 B1 * | 5/2002 | Fujimoto et al. | 710/316 |
| 7,380,004 B2 * | 5/2008 | Shimozono et al. | 710/316 |
| 7,773,420 B2 * | 8/2010 | Kim | 365/185.08 |
| 2007/0136617 A1 * | 6/2007 | Kanno et al. | 713/320 |
| 2007/0192546 A1 * | 8/2007 | Uchiumi et al. | 711/149 |
| 2009/0049234 A1 * | 2/2009 | Oh et al. | 711/103 |
| 2009/0083476 A1 * | 3/2009 | Pua et al. | 711/103 |
| 2010/0287333 A1 * | 11/2010 | Lee et al. | 711/103 |
| 2011/0264859 A1 * | 10/2011 | Yano et al. | 711/118 |

FOREIGN PATENT DOCUMENTS

| | | |
|---|---|---|
| KR | 10-1993-0021621 | 4/1996 |
| KR | 1996-0005394 | 4/1996 |
| KR | 10-0149687 | 6/1998 |
| WO | WO 2007/024435 | 3/2007 |
| WO | WO 2007/057270 | 5/2007 |

OTHER PUBLICATIONS

Jeong-Uk Kang & Heeseung Jo, et al., A Superblock-Based Flash Translation Layer for NAND Flash Memory, Proceedings of the 6th ACM & IEEE International Conference on Embedded Software, pp. 161-170, (Oct. 22-25, 2006).*

* cited by examiner

*Primary Examiner* — Pierre-Michel Bataille
(74) *Attorney, Agent, or Firm* — Harness, Dickey & Pierce, P.L.C.

(57) ABSTRACT

The solid state drive device includes a memory device including a plurality of flash memories and a memory controller connected with a host and configured to control the memory device. The memory controller includes first and second cores, a host interface configured to interface with the host, and a flash memory controller configured to control the plurality of flash memories. The first core is configured to control transmission and reception of data to and from the host. The second core is configured to control transmission and reception of data to and from the memory device.

20 Claims, 7 Drawing Sheets

SOLID STATE DRIVE DEVICE

CROSS-REFERENCE TO RELATED APPLICATION(S)

This U.S. non-provisional patent application claims priority under 35 U.S.C. §119 of Korean Patent Application No. 10-2009-0043143, filed on May 18, 2009, the entire contents of which are hereby incorporated by reference.

BACKGROUND

1. Field

Example embodiments of inventive concepts relate to a solid state drive, for example, to a solid state drive based on a dual core.

2. Description of the Related Art

According to the recent trend regarding a hard disk drive (HDD), demands for a solid state drive device employing a flash memory as a memory device replacing a magnetic disk device are increasing. For use as a mass storage device, a solid state drive device is inferior to a magnetic disk device in terms of memory capacity and cost, but is superior to the magnetic disk device in terms of access speed, miniaturization and safety against impact. Also, with advancement in process technology and design technology, it is expected that storage capacity of the solid state drive increases and cost decreases. Before long, the solid state drive device will replace the magnetic disk.

To use the foregoing solid state drive device as a mass storage device for a computer system or other potable devices, a controller compatible with a data exchange protocol of a host and a flash memory is needed.

In a general computer system, Advanced Technology Attachment (ATA), which is an interface standard for the connection of hard disks and was proposed by American IBM company, is used as a data transmission protocol for disk drives. For compatibility with this data transmission protocol, an interface for exchanging data with ATA standards and an interface for interfacing with a flash memory are needed. A device for controlling overall operations for the foregoing data exchange is called an SSD controller.

SUMMARY

Example embodiments of inventive concepts include a solid state drive device including a memory controller provided therein with a dual core.

According to example embodiments of inventive concepts, a solid state drive device includes a memory device including a plurality of flash memories and a memory controller connected with a host and configured to control the memory device. The memory controller includes first and second cores, a host interface configured to interface with the host, and a flash memory controller configured to control the plurality of flash memories. The first core is configured to control transmission and reception of data to and from the host. The second core is configured to control transmission and reception of data to and from the memory device.

In example embodiments of inventive concepts, the solid state drive device further includes a buffer manager configured to control a buffer temporarily storing the data during transmission or reception of data to and from the host.

In example embodiments of inventive concepts, the first core is configured to control the buffer manager and the host interface.

In example embodiments of inventive concepts, the second core is configured to control the flash memory controller.

In example embodiments of inventive concepts, at least one of the first and second cores includes a host interface layer configured to control the host interface, a cache allocation layer configured to control the buffer manager, a flash translation layer configured to control a flash translation layer (FTL) of the flash memory controller, and a flash interface layer configured to control an interface between the memory device and the memory controller.

In example embodiments of inventive concepts, the flash interface layer is further configured to control the flash memory controller to provide the interface to the memory device.

In example embodiments of inventive concepts, each of the first and second cores further include a queue manager storing an access command by the host, and the queue manager of the first core and the queue manager of the second core communicate with each other according to an Interprocess Communication (IPC) protocol.

In example embodiments of inventive concepts, each of the first and second cores includes a processor having an Advanced RISC Machine (ARM) architecture.

In example embodiments of inventive concepts, the host interface includes one of a S-ATA, P-ATA, USB and PCI interface.

In example embodiments of inventive concepts, the memory device further includes a plurality of channels, wherein the plurality of flash memories are connected to each of the plurality of channels.

In example embodiments of inventive concepts, the first core includes a first queue manager configured to store commands for controlling the memory device received by the first core from the host, and the second core includes a second queue manager configured to store the commands received by the second core from the first core.

In example embodiments of inventive concepts, the first queue manager is configured to directly transmit the commands to the second queue manager.

In example embodiments of inventive concepts, the first core is further configured to control reception of data to and from the host the memory device.

In example embodiments of inventive concepts, the memory controller is further configured to compare a number of the commands requested at the first and second queue managers.

In example embodiments of inventive concepts, the memory controller is further configured to migrate control of the one of the channels of the memory device from the first core to the second core if the number of commands requested at the first queue manager is greater than the number of the commands requested at the second queue manager by a first threshold value.

In example embodiments of inventive concepts, the memory controller is further configured to migrate control of the one of the channels of the memory device from the second core to the first core if the number of the commands requested at the second queue manager is greater than the number of the commands requested at the first queue manager by a second threshold value.

According to example embodiments of inventive concepts, a solid state drive device includes a memory device and a memory controller. The memory device includes a plurality of channels and a plurality of flash memories connected to each of the plurality of channels. The memory controller is connected with a host and configured to control the memory device. The memory controller includes a first core and a second core. The first core includes a first queue manager configured to store commands for controlling the memory device received from a host and configured to control reception of data to and from the memory device. The second core includes a second queue manager configured to store the commands received from the first queue manager and configured to control reception of data to and from the memory device. The memory controller is further configured to compare a number of commands requested at the first and second queue managers and configured to migrate control of at least one of the channels between the first and second cores based on a result of the comparison.

BRIEF DESCRIPTION OF THE DRAWINGS

The accompanying drawings are included to provide a further understanding of the inventive concepts, and are incorporated in and constitute a part of this specification. The drawings illustrate example embodiments of inventive concepts and, together with the description, serve to explain principles of inventive concepts. In the drawings.

DETAILED DESCRIPTION

Figure 1:
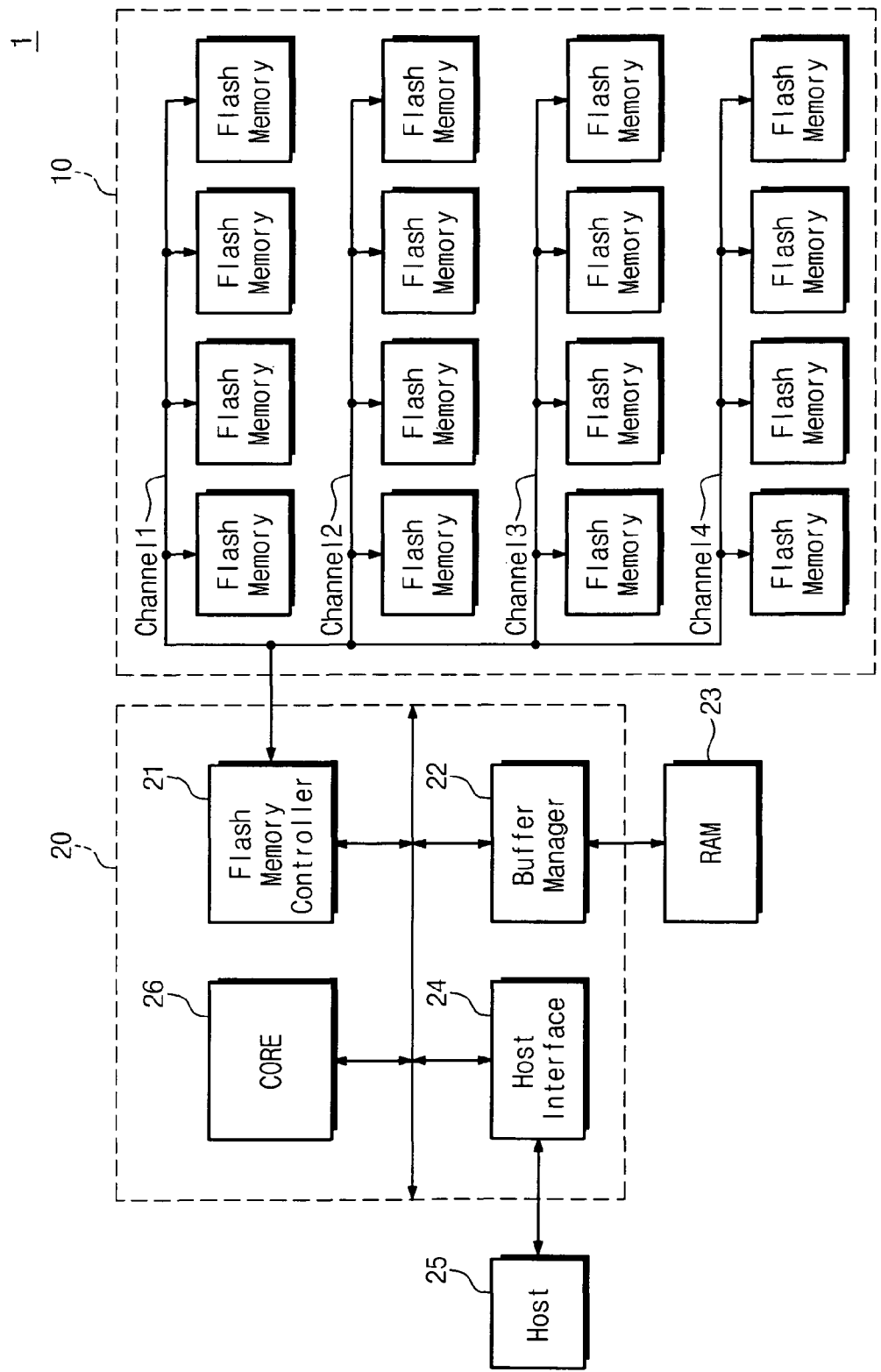
FIG. 1 is a block diagram showing a solid state drive device and a host connected to the solid state drive device according to example embodiments of inventive concepts.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures. The figures are intended to depict example embodiments and should not be interpreted to limit the intended scope of the claims. The accompanying figures are not to be considered as drawn to scale unless explicitly noted.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising," "includes" and/or "including", when used herein, specify the presence of stated features, integers, steps, operations, elements, and/or components, but do not preclude the presence or addition of one or more other features, integers, steps, operations, elements, components, and/or groups thereof. In this specification, the term "and/or" picks out each individual item as well as all combinations of them.

Example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

It should also be noted that in some alternative implementations, the functions/acts noted may occur out of the order noted in the FIGS. For example, two FIGS. shown in succession may in fact be executed substantially concurrently or may sometimes be executed in the reverse order, depending upon the functionality/acts involved.

When it is determined that a detailed description related to a related known function or configuration may make the purpose of example embodiments unnecessarily ambiguous, the detailed description thereof will be omitted. Also, terms used herein are defined to appropriately describe example embodiments and thus may be changed depending on a user, the intent of an operator, or a custom. Accordingly, the terms must be defined based on the following overall description within this specification.

Example embodiments of the inventive concepts will be described below in more detail with reference to the accompanying drawings. Example embodiments of inventive concepts may, however, be embodied in different forms and should not be construed as limited to example embodiments set forth herein. Rather, these example embodiments are provided so that this disclosure will be thorough and complete, and will fully convey the scope of inventive concepts to those skilled in the art.

FIG. 1 is a block diagram showing a solid state drive device and a host connected to the solid state drive device according to example embodiments of inventive concepts.

Referring to FIG. 1, a solid state drive device 1 according to example embodiments of inventive concepts includes a memory device 10 and a memory controller 20 controlling the memory device 10. The memory device 10 is a secondary storage device and is configured to store mass data. While examples of the secondary storage device may include hard disk drives (HDD), optical disk drives (ODD), etc., the memory device 10 according to example embodiments of inventive concepts is shown as a solid state drive (SSD) in FIG. 1. However, example embodiments of inventive concepts are not limited thereto.

The memory device 10 includes first to fourth channels Channel1-Channel4. Four flash memories are connected to each of the first to fourth channels Channel 1-Channel 4. For example, each of the flash memories may have a capacity of 2 gigabytes. Though the embodiment of FIG. 1 shows and describes that each of the first to fourth channels Channel 1-Channel4 includes four flash memories, the memory device 10 may be embodied to include more or less flash memories having varying storage capacity. Also, though FIG. 1 shows and describes the memory device 10 including the first to fourth channels Channel 1-Channel4, the memory device 10 may be embodied to include fewer or more channels.

The memory controller 20 includes a flash memory controller 21, a buffer manager 22, a host interface 24, and a core 26. The flash memory controller 21 controls the flash memories connected to each of the first to fourth channels Channel 1-Channel4.

The buffer manager 22 controls a RAM 23. The RAM 23 performs functions as a buffer temporarily storing data to be transmitted to a host 25 or temporarily storing data transmitted from the host 25 prior to storing the data transmitted from the host 25 in the memory device 10. The RAM 23 may be embodied by a dynamic random access memory (DRAM).

The host interface 24 connects the memory device 10 and the host 25 to each other. An example of the host interface 25 according to example embodiments of inventive concepts is a Serial Advanced Technology Attachment (S-ATA). Other examples of the host interface 24 may include at least one of Parallel Advanced Technology Attachment (P-ATA), USB, and Peripheral Component Interconnect (PCI) interfaces.

The core 26 controls the flash memory controller 21, the buffer manager 22 and the host interface 24. In general, the core 26 may be a processor, using for example, Advanced RISC Machine (ARM) architecture. The core 26 according to example embodiments of inventive concepts will be described with reference to FIGS. 2 and 3.

Figure 2:
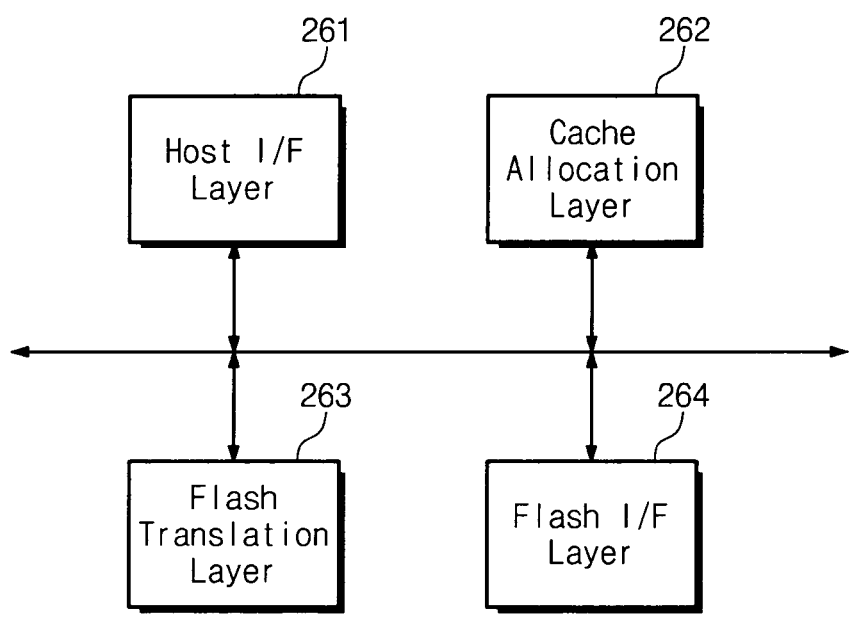
FIG. 2 shows software layers to be executed on the core shown in FIG. 1.

FIG. 2 shows software layers to be executed on the core 26 shown in FIG. 1.

Referring to FIGS. 1 and 2, example embodiments of inventive concepts include the memory controller 20 including a single core. The core 26 operates a host interface (I/F) layer 261, a cache allocation layer 262, a flash translation layer 263, and a flash I/F layer 264.

The host I/F layer 261 controls the host interface 24 such that the host 25 interfaces with the memory controller 20. The cache allocation layer 262 controls the buffer manager 22. The flash translation layer 263 controls a flash translation layer (FTL) of the flash memory controller 21. The flash interface layer 264 performs a control such that the flash memory controller 21 interfaces with the memory device 10.

The core 26 generally cannot operate other functional softwares while one of the software layers (e.g., one of host I/F layer 261, cache allocation layer 262, flash translation layer 263 and flash I/F layer 264) operates. Accordingly, this operation characteristic of the core 26 may restrict or reduce performance of the memory controller including a single core. Operations of the host I/F layer 261, the cache allocation layer 262, the flash translation layer 263 and the flash I/F layer 264 will be described in more detail with reference to FIG. 3.

Figure 3:
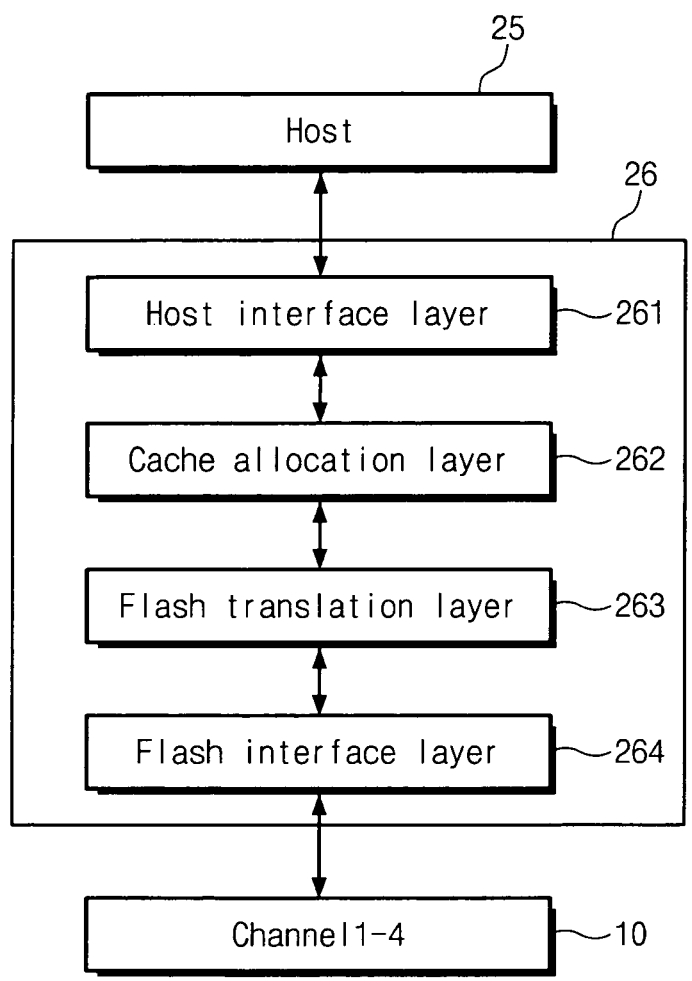
FIG. 3 is a hierarchical relationship of software layers illustrating internal operations of the core shown in FIG. 2.

FIG. 3 is a hierarchical relationship of software layers illustrating internal operations of the core shown in FIG. 2.

Referring to FIGS. 1 through 3, the host OF layer 261 controls the host interface 24 so as to provide an interface to the host 25. The cache allocation layer 262 controls the buffer manager 22 managing the RAM 23 temporarily storing data requested from the host 25. The cache allocation layer 262 controls the buffer manager 22 so as to temporarily store data requested from the host 25 through the host interface 24 in the RAM 23. The flash translation layer 263 controls the flash memory controller 21 such that the data requested by the host 25 is read out of the channel 1-channel 4. The flash interface layer 264 controls the flash memory controller 21 so as to provide an interface to the memory device 10.

The solid state drive device 1 includes only the single core 26. For example, the single core 26 is in charge of all processing operations related with the host 25 and the flash memories of the memory device 10. In the memory controller 20 including the single core, the core 26 may sequentially or simultaneously processes operations of the host I/F layer 261, the cache allocation layer 262, the flash translation layer 263 and the flash I/F layer 264. For example, the core 26 may process operations of the host I/F layer 261, the cache allocation layer 262, the flash translation layer 263 and the flash I/F layer 264 in parallel. Due to this parallel processing, the memory controller 20 including the single core has a limitation in its performance. Also, in recent years, increases in the number of channels have limited the performance of the single core-based memory controller.

Up to now, the memory controller 20 including the single core has been described. Hereinafter, a memory controller including two cores (e.g., dual cores) will be described in detail with reference to FIGS. 4 through 7.

Figure 4:
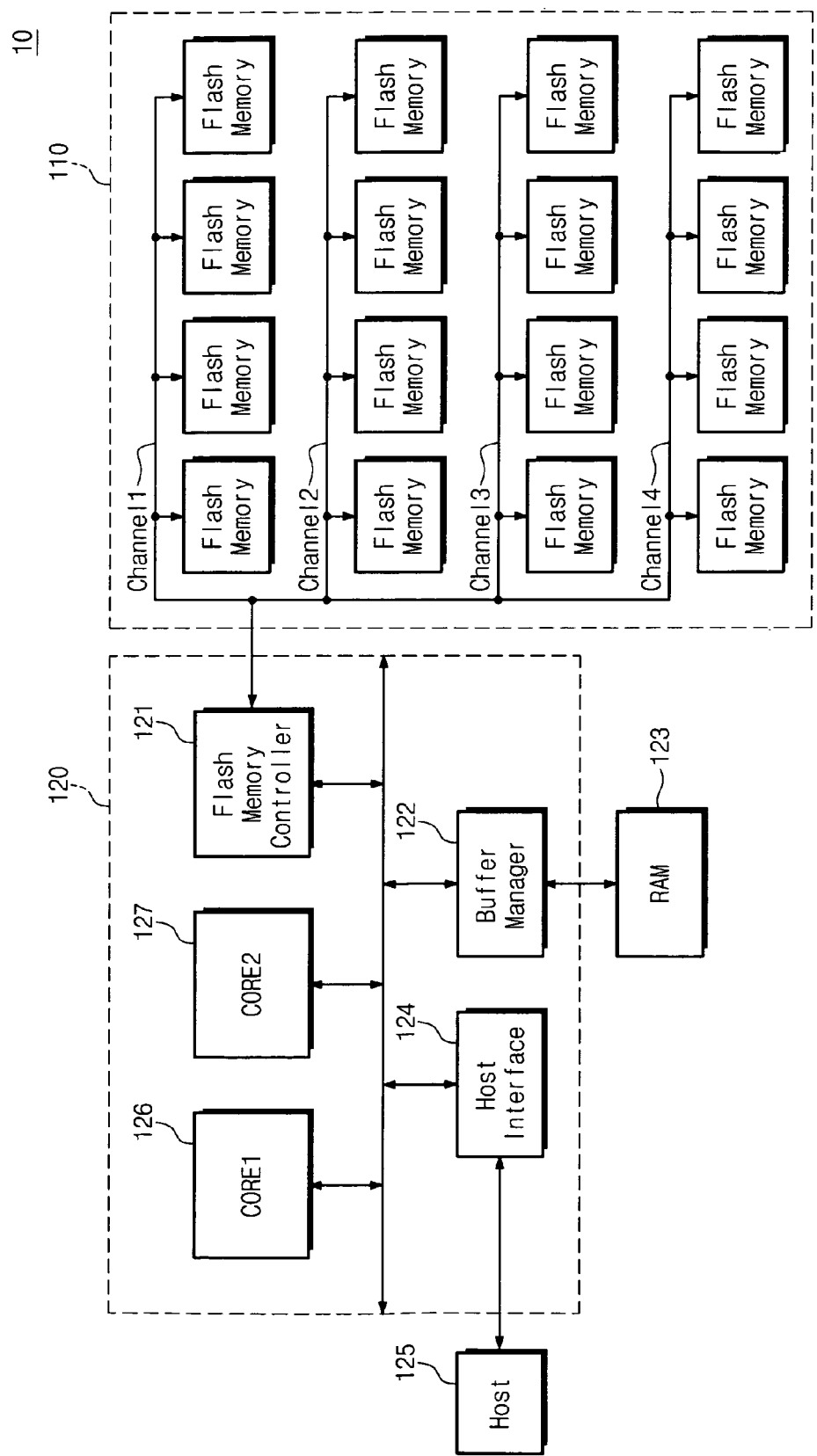
FIG. 4 is another block diagram showing a solid state drive device and a host connected to the solid state drive device according to example embodiments of inventive concepts.

FIG. 4 is another block diagram showing a solid state drive device and a host connected to the solid state drive device according to example embodiments of inventive concepts.

Referring to FIG. 4, a solid state drive device 10 according to example embodiments of inventive concepts includes a memory device 110 and a memory controller 120 controlling the memory device 110.

The memory device 110 is a secondary storage device and is configured to store mass data. The memory device 110 according to example embodiments of inventive concepts includes a solid state drive (SSD).

The memory device 110 includes first to fourth channels Channel 1-Channel4. Four flash memories are connected to each of the first to fourth channels Channel1-Channel4. For example, each of the flash memories may have a capacity of 2 gigabytes. Though the embodiment of FIG. 4 shows and describes that each of the first to fourth channels Channel 1-Channel4 includes four flash memories, the memory device 110 may be embodied to include more or less flash memories having varying storage capacity. Also, though FIG. 1 shows and describes the memory device 110 including the first to fourth channels Channel 1-Channel4, the memory device 110 may be embodied to include more or less channels.

The memory controller 120 includes a flash memory controller 121, a buffer manager 122, a host interface 124, and first and second cores 126 and 127 (CORE1 and CORE2). The flash memory controller 121 controls the flash memories connected to each of the channels Channel 1-Channel 4.

The buffer manager 122 controls a RAM 123. The RAM 123 performs functions as a buffer temporarily storing data to be transmitted to a host 125 or temporarily storing data transmitted from the host 125 prior to storing the data transmitted from the host 125 in the memory device 110. The RAM 123 transmits the temporarily stored data to the host 125 or the memory device 110 according to a control of the buffer manager 122. The host interface 124 connects the memory device 110 and the host 125 to each other.

The first and second cores 126 and 127 (CORE 1 and CORE 2) may divide and perform operations of a host interfacing, a cache allocation, a flash translation and a flash interfacing. For example, the first core 126 (CORE 1) may control the buffer manager 122 and the host interface 124, and the second core 127 (CORE 2) may control the flash memory controller 121. For example, the first core 126 (CORE 1) may be primarily responsible for processing related with the host 125, and the second core 127 (CORE 2) may be primarily responsible for processing related with the flash memories of the memory device 110. This case will be described in more detail with reference to FIG. 5.

Alternatively, the first core 126 (CORE 1) may control the flash memory controller 121, the buffer manager 122 and the host interface 124, and the second core 127 (CORE 2) may only control the flash memory controller 21. This case will be described in more detail with reference to FIG. 6.

Hereinafter, operations of the first and second cores 126 and 127 (CORE 1 and CORE 2) will be described in more detail with reference to FIGS. 5 through 7.

Figure 5:
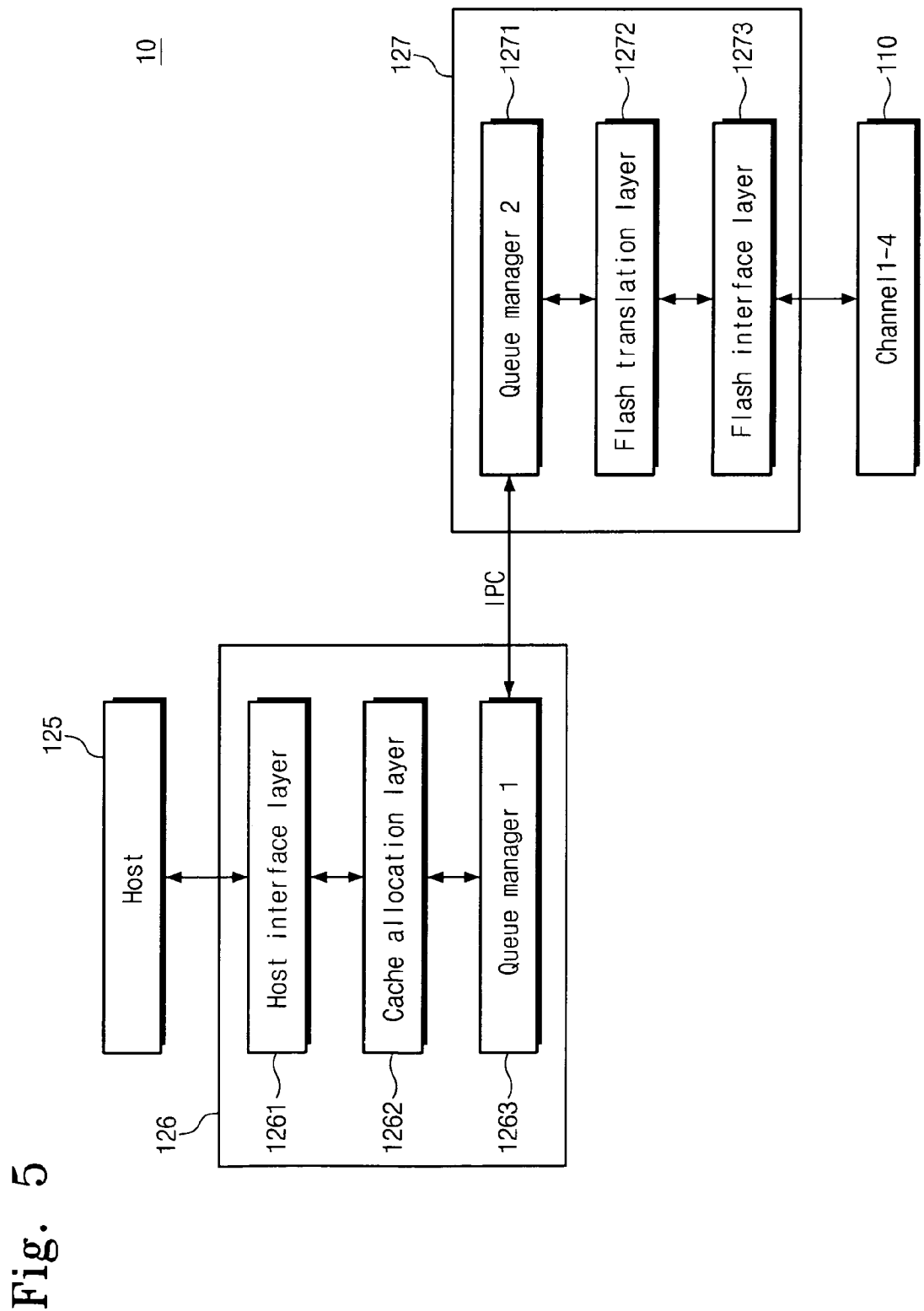
FIG. 5 is a method of assigning software layers between the first and second cores shown in FIG. 4 according to example embodiments of inventive concepts.

FIG. 5 is a method of assigning software layers illustrating operations of the first and second cores shown in FIG. 4 according to example embodiments of inventive concepts.

Referring to FIGS. 4 and 5, the first core 126 controls data input/output related with the host 125, and the second core 127 controls data input/output related with the memory device 110.

The first core 126 (CORE 1) operates a host I/F layer 1261, a cache allocation layer 1262, and a first Queue manager 1263. The host I/F layer 1261 controls the host interface 124 in response to a request from the host 125. The cache allocation layer 1262 controls the buffer manager 122 managing the RAM 123 temporarily storing data requested from the host 125. The first Queue manager 1263 sequentially stores commands inputted to the first core 126.

The second core 127 operates a second Queue manager 1271, a flash translation layer 1272, and a flash interface layer 1273. The second Queue manager 1271 sequentially stores commands inputted to the second core 127. The flash translation layer 1272 controls the flash memory controller 121 such that the data requested by the host 125 is read out of the first to fourth channels Channel1-Channel4. The flash interface layer 1273 controls the flash memory controller 121 so as to provide an interface to the memory device 110. The first and second Queue managers 1263 and 1271 may communicate according to an Interprocess Communication (IPC) protocol.

The IPC protocol is a set of program interfaces, which allow a programmer to generate and manage individual programs to be executed simultaneously on a single operating system, and which allow one program to simultaneously process requests of many users. IPC protocol provides an interface for a communication between processors.

Referring to FIGS. 4 and 5, the first Queue manager 1263 stores commands inputted from the host 125. The first Queue manager 1263 transmits a command directly controlling the memory device 110 to the second Queue manager 1271 according to the IPC protocol.

The first core 126 manages control necessary for data communication with the host 125, and the second core 127 manages control necessary for data communication with the memory device 110.

Accordingly, the memory controller 120 including the dual cores shown in FIG. 5 may perform the communication with the host 125 and the memory device 110 in parallel, compared with the memory controller 20 including the single core shown in FIG. 1.

Operations of the first and second cores according to example embodiments of inventive concepts will be further described with reference to FIG. 6.

Figure 6:
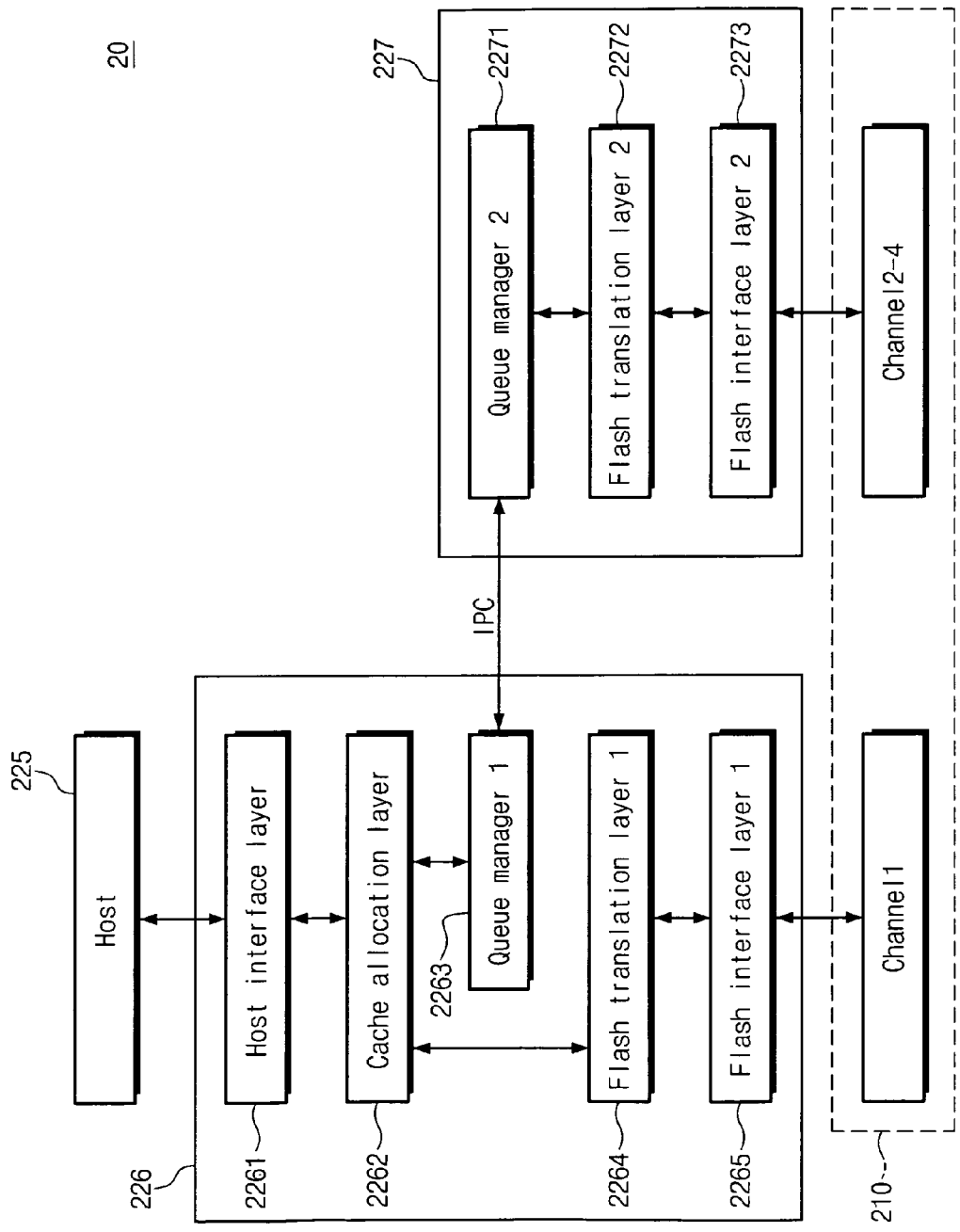
FIG. 6 is a method of assigning software layers of the first and second cores shown in FIG. 4 according to example embodiments of inventive concepts.

FIG. 6 is a schematic view illustrating operations of the first and second cores shown in FIG. 4 according to example embodiments of inventive concepts.

Referring to FIGS. 4 and 6, a first core 226 controls data input/output related with a host 225 and a memory device 210, and a second core 227 controls data input/output related with the memory device 210.

The first core 226 operates a host interface layer 2261, a cache allocation layer 2262, and a first Queue manager 2263, a first flash translation layer 2264, and a first flash interface layer 2265. The host interface layer 2261 controls a control to provide an interface to the host 225. The cache allocation layer 2262 performs a control to manager a buffer. The first Queue manager 2263 sequentially stores commands inputted to the first core 226. The first flash translation layer 2264 controls a first channel Channel1 of the memory device 210. The first flash interface layer 2273 performs a control to provide an interface to the memory device 210.

The second core 227 operates a second Queue manager 2271, a second flash translation layer 2272, and a second flash interface layer 2273. The second Queue manager 2271 sequentially stores commands inputted to the second core 227. The second flash translation layer 2272 controls second to fourth channels Channel2-Channel4. The second flash interface layer 2273 performs a control to provide an interface to the memory device 210.

The first and second Queue managers 2263 and 2271 may communicate according to the IPC protocol. For example, to equally maintain loads of the first and second cores 226 and 227, the first Queue manager 2263 may transmit a command directly controlling the memory device 210 to the second Queue manager 2271 according to the IPC protocol.

In addition, to equally maintain loads of the first and second cores 226 and 227, the first core 226 may directly control the flash memory device connected to a specific channel. For example, as shown in FIG. 6, the first core 226 may directly control the first channel Channel1, and the second core 227 may directly control the second to fourth channels Channels2-4. Alternatively, the first core 226 may directly control the first and second channels Channels1-2, and the second core 227 may directly control the third and fourth channels Channels3-4. However, example embodiments of inventive concepts are not limited to the above allocation of channels between the first and second cores 226 and 227. Instead, example embodiments of inventive may include more than two cores with the channels being allocated between the cores according to various combinations.

Further, to equally maintain loads of the first and second cores 226 and 227, the first Queue manager 2263 may transmit a stored command (i.e., requested Queue) to the second Queue manager 2271 according to the IPC protocol. These operations will be described with reference to FIG. 7.

Figure 7:
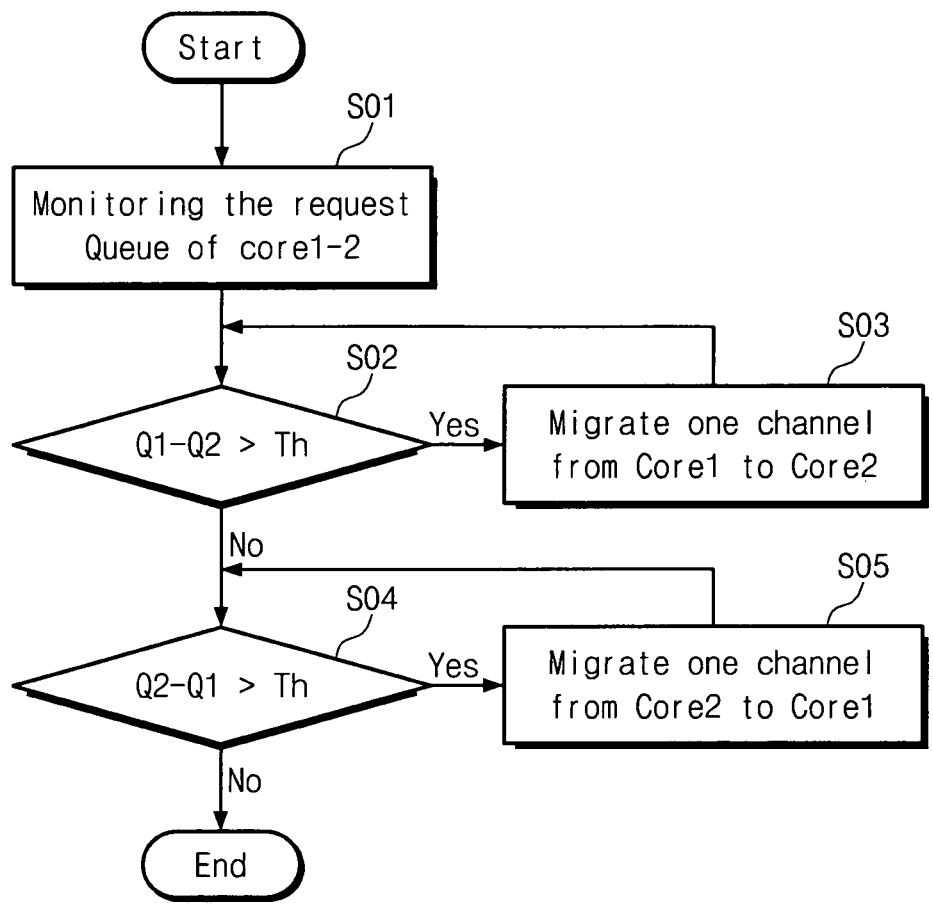
FIG. 7 is a flowchart illustrating operations of the Queue managers shown in FIG. 6.

FIG. 7 is a flowchart illustrating operations of the Queue managers shown in FIG. 6.

Referring to FIGS. 6 and 7, the first Queue manager 2263 stores a command transmitted from the host 225. The first Queue manager 2263 transmits a command related with the memory device 210 to the second Queue manager 2271 according to the IPC protocol. Each of the first and second Queue managers 2263 and 2271 monitor the command (i.e., Queue) transmitted from the host 225 at step S01. Then, the memory controller 120, such as at least one of the first and second cores 126 and 127, compares whether the number of Queues requested to the first Queue manager 2263 is greater than the number of Queues requested to the second Queue manager 2271 by a threshold value (Th) at step S02. If the number of Queues requested to the first Queue manager 2263 is greater than the number of Queues requested to the second Queue manager 2271 by a threshold value (Th), the first core 226 migrates one of the channels processed by itself to the second core 227 at step S03, and then returns to step S02. For example, as shown in FIG. 6, the first core 226 directly controls the first channel Channel 1. In operation S02, if the number of Queues requested to the first Queue manager 2263 is greater than the number of Queues requested to the second Queue manager 2271 by a threshold value (Th), the first channel Channel1 may instead be controlled directly by the second core 227.

If the number of Queues requested to the first Queue manager 2263 is not greater than the number of Queues requested to the second Queue manager 2271 by a threshold value (Th) at step S02, then it is compared whether the number of Queues stored in the second Queue manager 2271 is greater than the number of Queues stored in the first Queue manager 2263 by a threshold value (Th) at step S04. If the number of Queues stored in the second Queue manager 2271 is greater than the number of Queues stored in the first Queue manager 2263 by a threshold value (Th), the second core 227 migrates one of the channels processed by itself to the first core 226 at step S05, and then returns to step S04. When the number of Queues stored in the second Queue manager 2271 is not greater than the number of Queues stored in the first Queue manager 2263 by a threshold value (Th), all operations are ended.

For example, as shown in FIG. 6, the second core 227 directly controls the second to fourth channels Channel1-Channel4. At step S04, when the number of Queues stored in the second Queue manager 2271 is greater than the number of Queues stored in the first Queue manager 2263 by a threshold value (Th), the second channel Channel2 may be controlled instead by the first core 226.

The memory controller including the dual cores according to example embodiments of inventive concepts may communicate data with the host 225 and the memory device 210 in parallel, compared with the memory controller including the single core shown in FIG. 1.

For example, as shown in FIG. 5, the first core 126 manages control necessary for data communication with the host 125, and the second core 127 manages control necessary for data communication with the memory device 110.

Also, as shown in FIGS. 6 and 7, the first core 226 manages control necessary for data communication with the host 225 and the memory device 210, and the second core 227 manages control necessary for data communication with the memory device 210.

Accordingly, example embodiments of inventive concepts may enhance the performance of the memory controller and decrease the load of the host.

The solid state drive device including the dual cores according to example embodiments of inventive concepts may decrease the load of the host processor.

The above-disclosed subject matter is to be considered illustrative and not restrictive, and the appended claims are intended to cover all such modifications, enhancements, and other embodiments, which fall within the true spirit and scope of example embodiments of inventive concepts. Thus, to the maximum extent allowed by law, the scope of example embodiments of inventive concepts is to be determined by the broadest permissible interpretation of the following claims and their equivalents, and shall not be restricted or limited by the foregoing detailed description.

What is claimed is:

1. A solid state drive device comprising:
   a memory device including a plurality of nonvolatile memories; and
   a memory controller connected with a host and configured to control the memory device, the memory controller including,
   first and second cores,
   a host interface configured to interface with the host, and
   a nonvolatile memory controller configured to control the plurality of nonvolatile memories, wherein
   the first core is configured to operate a host interface layer and a cache allocation layer, and
   the second core is configured to operate a flash translation layer and a flash interface layer in parallel with one of the operation of the host interface layer in the first core and the operation of the cache allocation layer in the first core.

2. The solid state drive device of claim 1, further comprising:
   a buffer manager configured to control a buffer temporarily storing data and coupled to the first core and the second core.

3. The solid state drive device of claim 2, wherein the first core is configured to control the buffer manager and the host interface by operating the cache allocation layer and the host interface layer respectively.

4. The solid state drive device of claim 3, wherein the second core is configured to control the nonvolatile memory controller by operating the flash translation layer and the flash interface layer.

5. The solid state drive device of claim 3, wherein,
   the host interface layer is configured to control the host interface,
   the cache allocation layer is configured to control the buffer manager,
   the flash translation layer is configured to control a flash translation layer (FTL) of the nonvolatile memory controller, and the solid state drive device further comprises:
   the flash interface layer configured to control an interface between the memory device and the memory controller.

6. The solid state drive device of claim 5, wherein the flash interface layer is further configured to control the nonvolatile memory controller to provide the interface to the memory device.

7. The solid state drive device of claim 5, wherein each of the first and second cores further operates a queue manager storing an access command by the host, and the queue manager of the first core and the queue manager of the second core communicate with each other according to an Interprocess Communication (IPC) protocol.

8. The solid state drive device of claim 1, wherein each of the first and second cores include a processor having an Advanced RISC Machine (ARM) architecture on which one of the host interface layer, the cache allocation layer, the flash translation layer and the flash interface layer is executed.

9. The solid state drive device of claim 1, wherein the host interface includes one of a S-ATA, P-ATA, USB and PCI interface.

10. The solid state drive device of claim 1, wherein the memory device comprises:
a plurality of channels configured to be coupled to the first core and the second core, wherein
the plurality of nonvolatile memories are connected to each of the plurality of channels.

11. The solid state drive device of claim 10, wherein,
the first core includes a first queue manager configured to store commands for controlling the memory device received by the first core from the host, and
the second core includes a second queue manager configured to store the commands received by the second core from the first core.

12. The solid state drive device of claim 11, wherein, the first queue manager is configured to directly transmit the commands to the second queue manager.

13. The solid state drive device of claim 12, wherein the first and second queue managers are configured to communicate according to an Interprocess Communication (IPC) protocol.

14. The solid state drive device of claim 11, wherein the memory controller is further configured to migrate control of the one of the channels of the memory device from the second core to the first core if a number of the commands requested at the second queue manager is greater than a number of the commands requested at the first queue manager by a first threshold value.

15. The solid state drive device of claim 14, wherein the memory controller is further configured to migrate control of the one of the channels of the memory device from the second core to the first core if the number of the commands requested at the second queue manager is greater than the number of the commands requested at the first queue manager by a second threshold value.

16. A solid state drive device comprising:
a memory device including a plurality of channels and a plurality of nonvolatile memories connected to each of the plurality of channels; and
a memory controller connected with a host and configured to control the memory device, the memory controller including,
a first core including a first queue manager configured to store commands for controlling the memory device received from the host and configured to control reception of data to and from the memory device, and
a second core including a second queue manager configured to store the commands received from the first queue manager, and configured to control reception of data to and from the memory device, the second core configured to operate in parallel with the first core, wherein
the memory controller is further configured to compare a number of commands requested at the first and second queue managers, and configured to migrate control of at least one of the channels between the first and second cores based on a result of the comparison.

17. The solid state drive device of claim 16, wherein the memory controller is further configured to migrate control of the one of the channels of the memory device from the first core to the second core if the number of commands requested at the first queue manager is greater than the number of the commands requested at the second queue manager by a first threshold value.

18. The solid state drive device of claim 17, wherein the memory controller is further configured to migrate control of the one of the channels of the memory device from the second core to the first core if the number of commands requested at the second queue manager is greater than the number of the commands requested at the first queue manager by a second threshold value.

19. A method of controlling a solid state drive device, the solid state device including a memory device having a plurality of nonvolatile memories and a memory controller connected with a host, the method comprising:
interfacing, by a host interface of the memory controller, with the host;
controlling, by the memory controller, the memory device;
controlling, by a nonvolatile memory controller of the memory controller, the plurality of nonvolatile memories;
operating, by a first core of the memory controller, a host interface layer and a cache allocation layer; and
operating, by a second core of the memory controller, a flash translation layer and a flash interface layer in parallel with one of the operating the host interface layer in the first core and the operating the cache allocation layer in the first core.

20. The method of claim 19, further comprising:
controlling, by a buffer manager, a buffer temporarily storing data and coupled to the first core and the second core.

* * * * *